(12) United States Patent
Bileth

(10) Patent No.: US 10,113,574 B1
(45) Date of Patent: Oct. 30, 2018

(54) WORKBENCH PANEL HOLDER CLAMP FIXTURE AND SYSTEM

(71) Applicant: Jeffrey A. Bileth, Caledonia, MI (US)

(72) Inventor: Jeffrey A. Bileth, Caledonia, MI (US)

( * ) Notice: Subject to any disclaimer, the term of this patent is extended or adjusted under 35 U.S.C. 154(b) by 344 days.

(21) Appl. No.: 14/863,812

(22) Filed: Sep. 24, 2015

(51) Int. Cl.
*B23P 19/10* (2006.01)
*F16B 12/10* (2006.01)
*F16B 2/12* (2006.01)
*B25H 1/02* (2006.01)

(52) U.S. Cl.
CPC ............... *F16B 12/10* (2013.01); *B25H 1/02* (2013.01); *F16B 2/12* (2013.01)

(58) Field of Classification Search
CPC ... B23Q 1/00; B23Q 1/03; B23Q 1/25; B23Q 1/70; B23Q 9/00; B23Q 1/28; B23Q 3/00; B23Q 3/06; B23Q 3/154
See application file for complete search history.

(56) References Cited

U.S. PATENT DOCUMENTS

| | | | | |
|---|---|---|---|---|
| 2,991,669 A | * | 7/1961 | Stock | B25B 5/003 269/135 |
| 3,362,673 A | * | 1/1968 | Patch | B01D 61/30 248/133 |
| 3,643,935 A | * | 2/1972 | Bell | B25H 1/00 108/8 |
| 4,239,197 A | * | 12/1980 | Olstad | B23Q 1/525 269/152 |
| 6,024,348 A | * | 2/2000 | Ventura | B05B 13/0285 269/104 |
| 7,448,606 B1 | * | 11/2008 | Johnson | B05B 13/0285 269/16 |
| 9,221,168 B2 | * | 12/2015 | Boyd | B25H 1/04 |
| 9,656,356 B2 | * | 5/2017 | Pemberton | E06B 3/67386 |

* cited by examiner

*Primary Examiner* — Lee D Wilson
(74) *Attorney, Agent, or Firm* — Gardner, Linn, Burkhart, Ondersma, LLP

(57) ABSTRACT

A clamp fixture for affixing a panel to a workbench, the clamp fixture comprising a lower fixture portion that adjustably mates with an upper fixture portion and a lower end portion. The upper fixture portion comprises an upper end portion. A lower clamp is disposed on the lower end portion. The lower clamp is operable to engage a bottom area of a workbench. A middle clamp is disposed on the upper fixture portion. The middle clamp is operable to engage a top area of the workbench. An upper clamp is disposed on the upper end portion. The lower clamp and the middle clamp are adjustably separable relative to each other via the lower fixture portion to affix the clamp fixture to the workbench. The middle clamp and the upper clamp are configured to hold a panel there between.

14 Claims, 12 Drawing Sheets

WORKBENCH PANEL HOLDER CLAMP FIXTURE AND SYSTEM

BACKGROUND OF THE INVENTION

The present invention is directed to workbench fixtures, and more particularly to affixing clamping fixtures to a workbench for securing a pegboard to the workbench. Conventional workbenches do not include pegboards.

SUMMARY OF THE INVENTION

The present invention provides a clamp fixture assembly, clamp fixtures and methods and systems for affixing one or more panels, such as pegboards, to a workbench. The clamp fixture assembly includes one or more adjustable clamp fixtures that allow the clamp fixture assembly to be adjustably affixed to workbenches with a variety of dimensions. The clamp fixture assembly also allows a variety of panel sizes to be held by the clamp fixture assembly.

According to an aspect of the present invention, a clamp fixture for affixing pegboard to a workbench includes a lower fixture portion that adjustably mates with an upper fixture portion and a lower end portion. The upper fixture portion comprises an upper end portion. A lower clamp is disposed on the lower end portion and is operable to engage a bottom area of a workbench. A middle clamp is disposed on the upper fixture portion. The middle clamp is operable to engage a top area of said workbench. Lastly, an upper clamp is disposed on the upper end portion. The lower clamp and the middle clamp are adjustably separable relative to each other via the lower fixture portion to affix the clamp fixture to the workbench. The middle clamp and the upper clamp are configured to hold a pegboard there between.

According to an aspect of the present invention, a clamp fixture assembly for affixing pegboard to a workbench comprises one or more clamp fixtures. Each clamp fixture includes a lower fixture portion that adjustably mates with an upper fixture portion and a lower end portion. The upper fixture portion comprises an upper end portion. A lower clamp is disposed on the lower end portion and is operable to engage a bottom area of a workbench. A middle clamp is disposed on the upper fixture portion. The middle clamp is operable to engage a top area of said workbench. Lastly, an upper clamp is disposed on the upper end portion. The lower clamp and the middle clamp are adjustably separable relative to each other via the lower fixture portion to affix the clamp fixture to the workbench. The middle clamp and the upper clamp are configured to hold a pegboard there between.

According to an aspect of the present invention, a method for affixing pegboard to a workbench includes arranging a clamp fixture that includes an upper fixture portion adjustably mated to a lower fixture portion and a lower end portion, such that a middle clamp disposed on the upper fixture engages a top area of a workbench and a lower clamp disposed on the lower end portion engages a bottom area of the workbench. The lower clamp and the middle clamp are adjustably separable relative to each other via the lower fixture portion to affix the clamp fixture to the workbench. The middle clamp and a top clamp disposed to an upper end portion adjustably mated to the upper fixture portion are arranged such that the middle clamp and the top clamp hold a pegboard between them.

According to a further aspect of the present invention, the upper end portion is separate from the upper fixture portion whereby the upper clamp and the middle clamp are adjustably separable relative to each other.

According to a further aspect of the present invention, the clamp fixture further comprises a biasing member disposed on the upper end portion to define the adjustable separability of the upper clamp and the middle clamp, wherein the biasing member may be one of a spring and a weight.

According to a further aspect of the present invention, the clamp fixture assembly includes two or more clamp fixtures for affixing the pegboard to the workbench. The two or more clamp fixtures are arranged across a width of the pegboard.

As discussed herein, the use of clamp fixture(s) allows one or more pegboards to be reliably mounted to a workbench. As also discussed herein, the clamp fixtures are adjustable to accommodate pegboards over a range of lengths. Similarly, the adjustable clamp fixtures may also accommodate a workbench over a range of heights.

These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
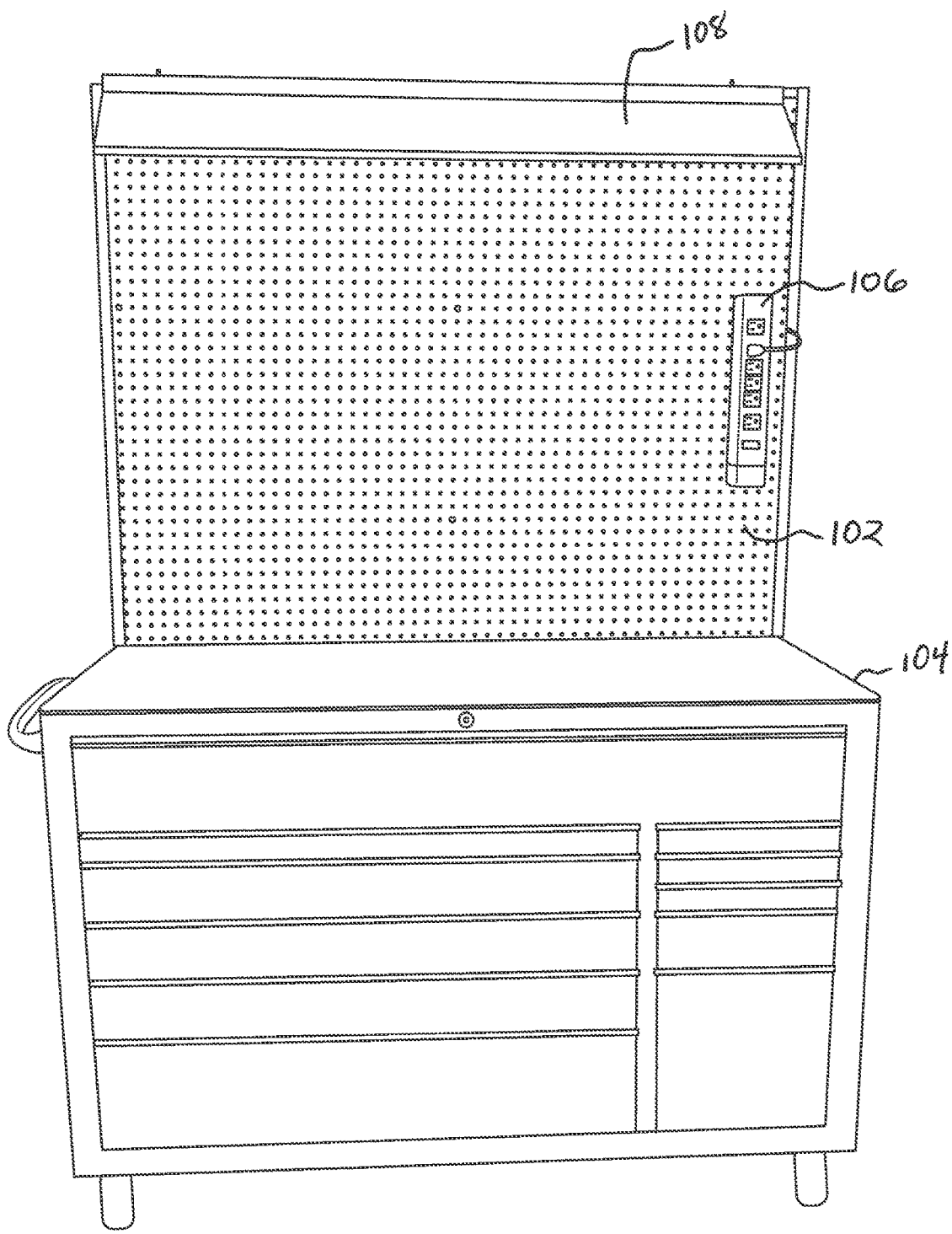
FIG. 1 is an exemplary three-dimensional forward view of a workbench with pegboard affixed by a clamp fixture assembly in accordance with an embodiment of the present disclosure.
Figure 2:
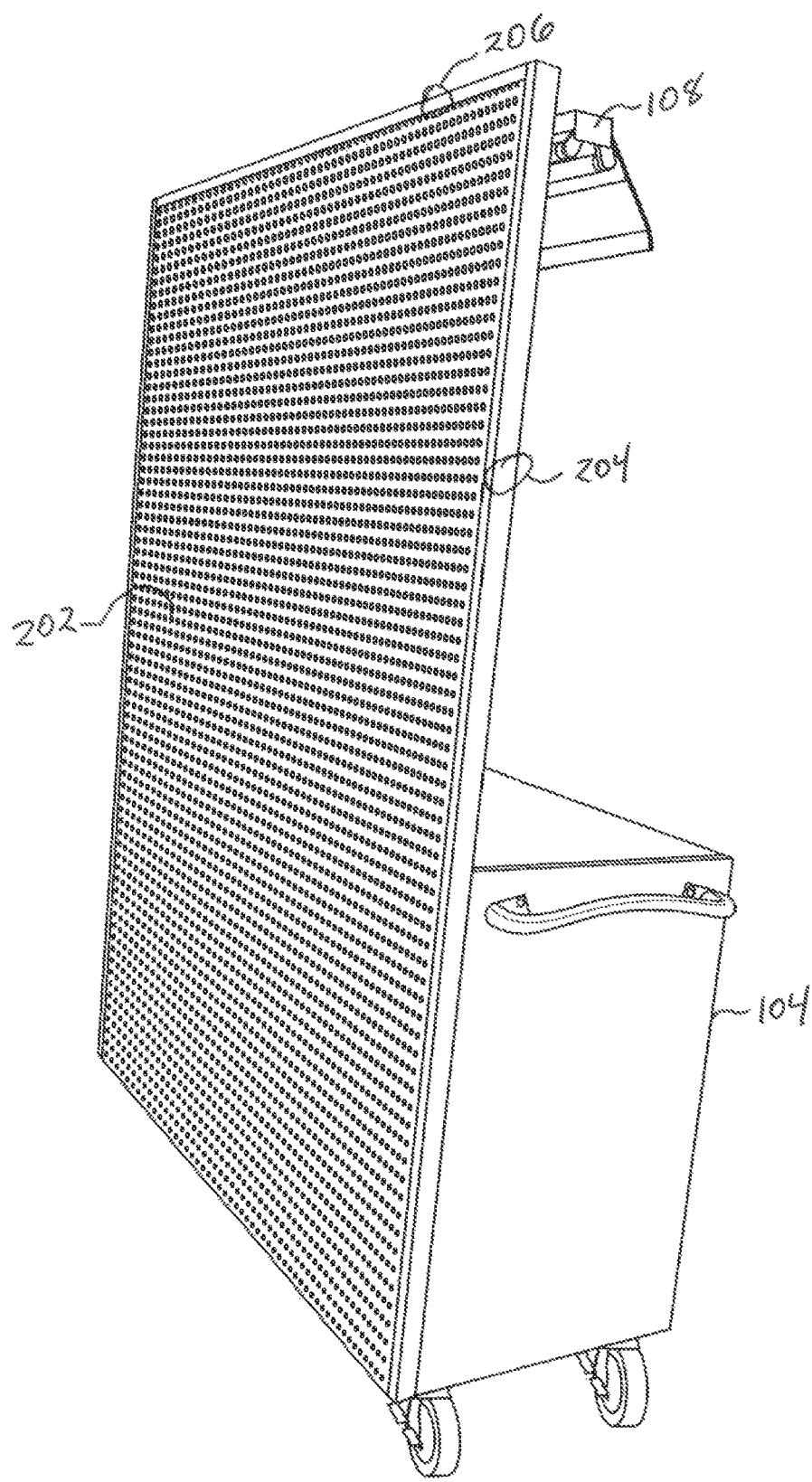
FIG. 2 is an exemplary three-dimensional rear view of the workbench with pegboard affixed by the clamp fixture assembly illustrated in FIG. 1, in accordance with an embodiment of the present disclosure.
Figure 3:
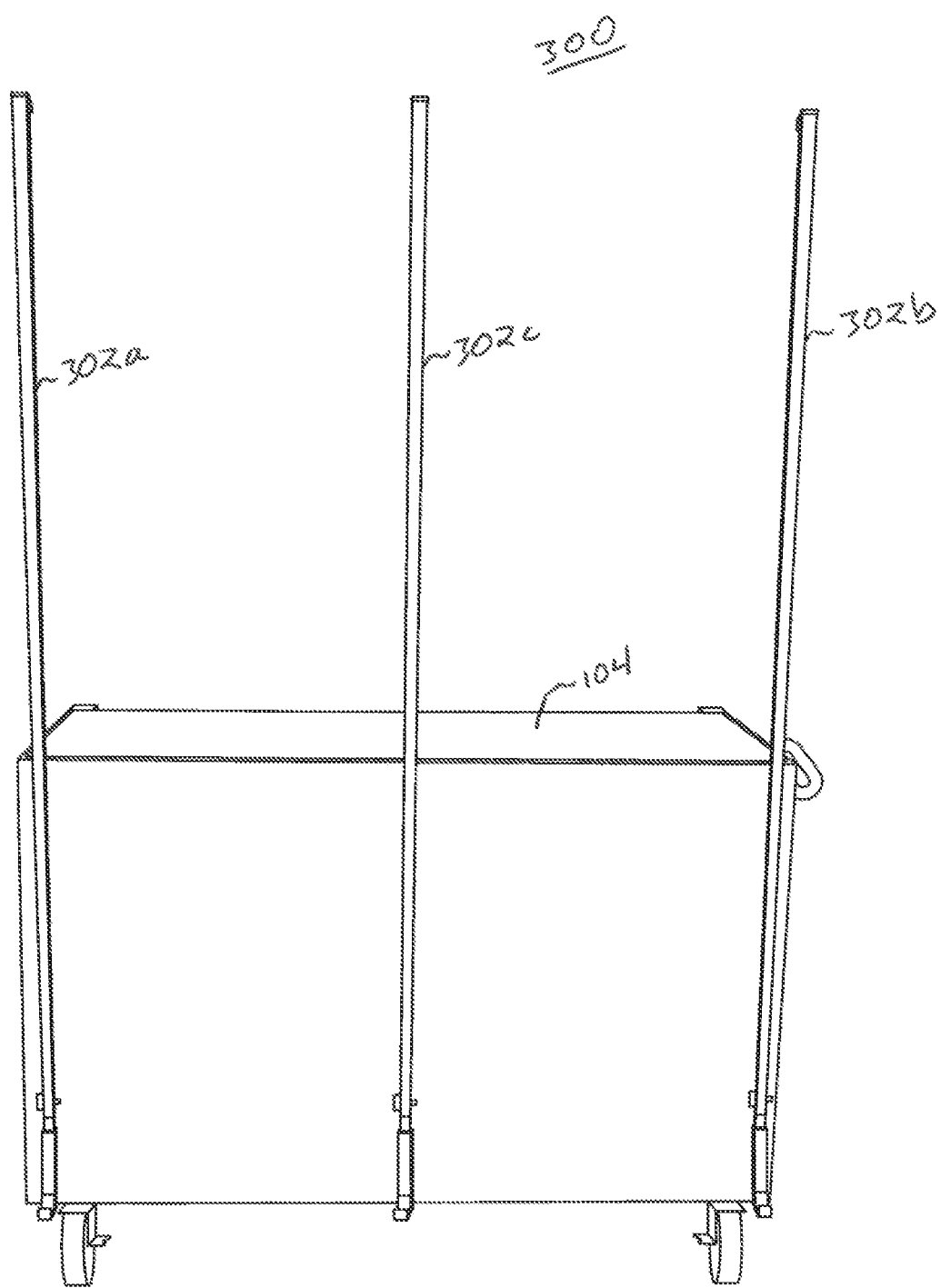
FIG. 3 is an exemplary three-dimensional rear view of a workbench with clamp fixture assembly in accordance with an embodiment of the present disclosure.

As illustrated in FIG. 1, an exemplary forward panel, which in the illustrated embodiment comprises a pegboard 102, is vertically mounted above a workbench 104. As discussed herein, an exemplary clamp assembly 300, illustrated in FIG. 3, provides an adjustable, yet stable clamping to hold the forward pegboard 102 sufficiently stable enough to support one or more accessories, such as e.g., a power strip 106 and a light FIG. 108. Obviously, other accessories may also be securely mounted to the forward pegboard 102. As discussed in detail herein, upper clamps 402 and middle clamps 602 (FIGS. 4 & 6) of the clamp assembly 300 extend around a top and a bottom of the forward pegboard 102. A three-dimensional side or corner view is illustrated in FIG. 2. FIG. 2 illustrates a rear pegboard 202 that is also vertically mounted to the workbench 104 via the clamp assembly 300. As discussed in detail herein, a bottom edge of the rear pegboard 202 rests on a lower clamp 502 (FIG. 5) of the clamp assembly 300. To hold the rear pegboard 202 in place, several screws may be inserted through the rear pegboard 202 and into the clamp assembly 300. The clamp assembly 300 is sandwiched between the forward pegboard 102 and the rear pegboard 202. FIG. 2 also illustrates an exemplary edging 204, 206 that includes a side portion 204 and a top portion 206. As illustrated in FIG. 2, the edging 204, 206 wraps around to hide the edges of both the forward pegboard 102 and the rear pegboard 202. As also illustrated in FIGS. 1 and 2, top edges of the front pegboard 102 and the rear pegboard 202 are level.

As illustrated in FIG. 3, an exemplary workbench pegboard clamp assembly, also referred to as a clamp fixture assembly 300, comprises a plurality of clamp fixtures 302. In one embodiment, illustrated in FIG. 3, three identical clamp fixtures 302 are attached to a workbench 104 an equidistance apart along a backside of the workbench 104. In other embodiments, additional or fewer clamp fixtures 302 may be utilized. As also illustrated in FIG. 3, a left clamp fixture 302a is attached to a left rear edge of the workbench 104, a right clamp fixture 302b is attached to a right rear edge of the workbench 104, and a middle clamp fixture 302c is attached to a rear edge of the workbench 104 an equal distance between the right clamp fixture 302a and the left clamp fixture 302b. Note that the clamp fixtures 302a, 302b, and 302c each comprise a clamp fixture 302.

Figure 4:
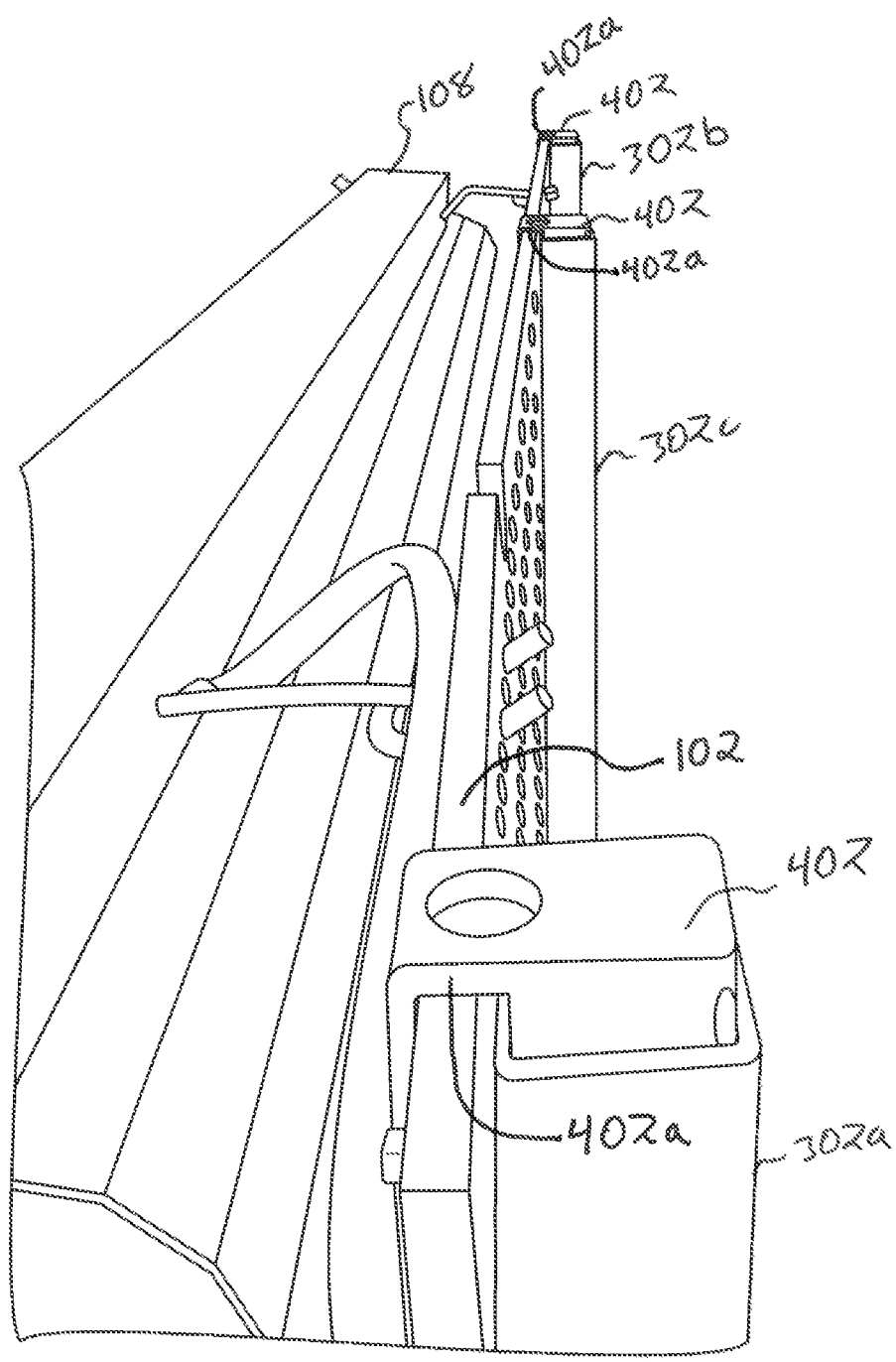
FIG. 4 is an exemplary three-dimensional top-down view of a pegboard retained by a clamp fixture assembly in accordance with an embodiment of the present disclosure.

FIG. 4 illustrates exemplary upper clamps 402 of the clamp fixtures 302a-302c with clamp arms 402a that extend over and in front of a portion of the front pegboard 102 to hold the front pegboard 202 between the upper clamps 402 and middle clamps 602 (FIG. 6) of the clamp fixtures 302a-302c. FIG. 4 also illustrates that the upper clamps 402 are wide enough to allow the top edge of the front pegboard 102 to fit within the upper clamps 402 via a clamp hook extension or arm 402a protruding from the upper clamp 402 to extend around the top edge of the front pegboard 102. In one embodiment, the upper clamps 402 and their corresponding clamp arms 402a may be wide enough to accommodate a reasonable variety of pegboard thicknesses. FIG. 4 also illustrates how an accessory, e.g., a lighting fixture 108, may be secured to the front pegboard 102.

Figure 5:
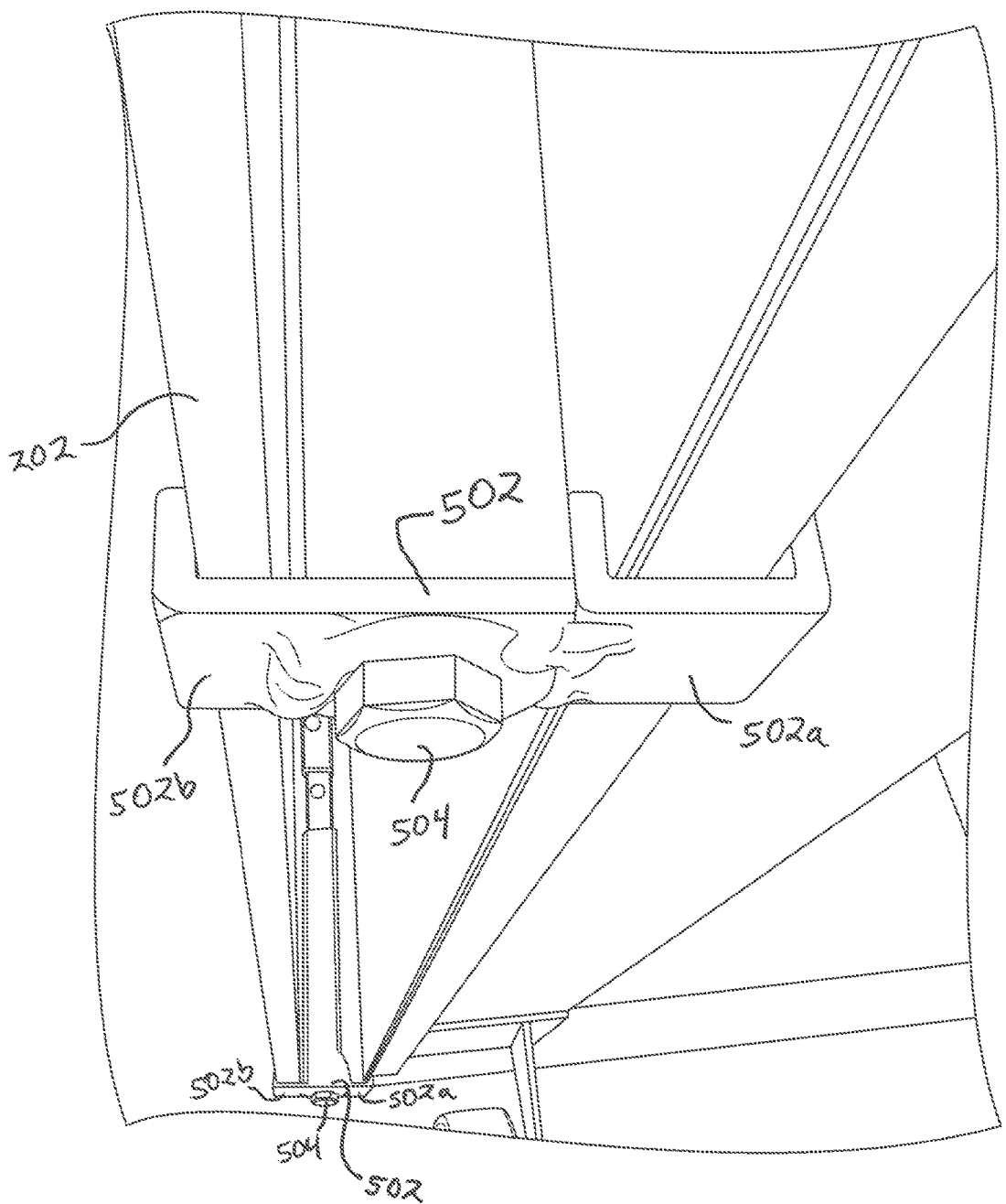
FIG. 5 is an exemplary three-dimensional bottom view of a pegboard retained by a clamp fixture assembly in accordance with an embodiment of the present disclosure.

FIG. 5 illustrates exemplary lower clamps 502 of the clamp fixture 302 used in conjunction with middle clamps 602 (FIG. 6) to hold the clamp fixtures 302a-302c around both an upper edge or lip of the workbench 104 and a lower edge or lip of the workbench 104. The lower clamp 502 grips the lower edge of the workbench 104 and the middle clamp 602 grips the upper edge of the workbench 104. FIG. 5 also illustrates adjustment bolts 504 on the bottom of the clamp fixtures 302a-302c. As discussed herein, the adjustment bolt 504 is used to finely adjust the distance between the lower clamp 502 and the middle clamp 602, and thereby tighten or secure the clamp fixture 302 to the workbench 104. FIG. 5 also illustrates a rear pegboard 202 resting on the lower clamps 502. As also illustrated in FIG. 5, each of the lower clamps 502 includes an inner arm 502a that grips the underside of the workbench 104 and an outer arm 502b that holds the bottom edge of the rear pegboard 202.

Figure 6:
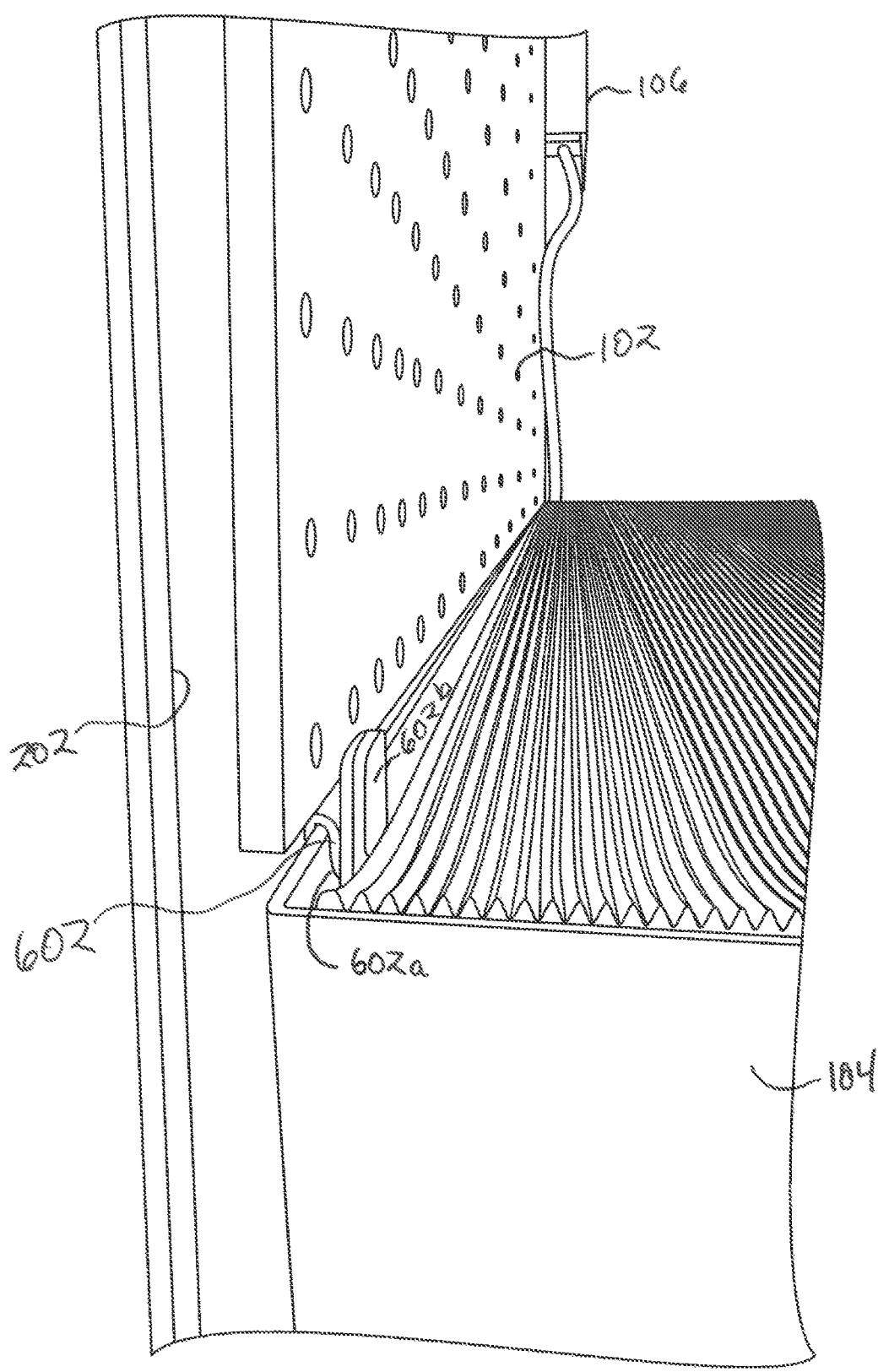
FIG. 6 is an exemplary three-dimensional side view of a pegboard retained by a clamp fixture assembly in accordance with an embodiment of the present disclosure.

As illustrated in FIG. 6, the front pegboard 102 is held between pairs of clamps with a lower edge of the forward pegboard 102 positioned approximately level with an upper edge of the workbench 104. As illustrated in FIG. 6, the lower edge of the pegboard 102 rests upon middle clamps 602 of the clamp fixtures 302a-302c. As also illustrated in FIG. 6, each of the middle clamps 602 includes a bottom-side arm 602a that grips the topside of the workbench 104 and a top-side arm 602b that holds the bottom edge of the front pegboard 102. Bottom-side arm 602a thus defines a first middle clamp and top-side arm 602b defines a second middle clamp. In the illustrated embodiment, bottom-side arm 602a and top-side arm 602b of middle clamp 602 are unitarily formed by an extension member that is affixed to and extends from the upper fixture portion, with a generally planar member affixed to the extension member. It should be appreciated, however, that middle clamp 602 may be alternatively constructed to be form separate middle clamps rather than the illustrated unitarily formed middle clamp 602.

Embodiments of the present disclosure may mount to a variety of different workbenches and different workbench sizes. The workbench illustrated in FIGS. 1-2 is an illustrative example of a possible workbench/mounting fixture combination. Similarly, a variety of different pegboard sizes may be used with embodiments of the present disclosure because biased clamps (e.g., spring-loaded clamps and weighted clamps) are used to retain forward pegboards 102 of a variety of different dimensions. In one embodiment, illustrated in FIG. 1, a workbench 104 may be 36 inches in height with a front pegboard 102 having a similar height (approximately 36 inches). Such a combination would require the clamp fixtures 302a-302c to expand to a length of 72 inches. Of course, as discussed herein, the clamp fixture 302 would need to expand to a length greater than 72 inches to allow the pegboard 102 to be captured. As discussed herein, biased clamps may extend enough to allow the insertion of pegboards of a variety of heights.

Figure 7:
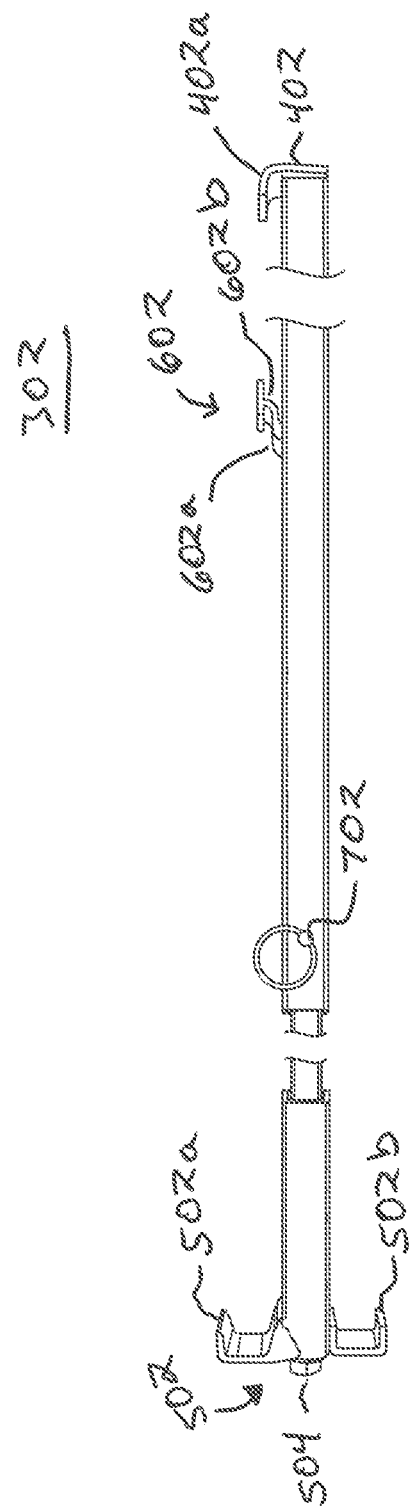
FIG. 7 is a top down, plane view of an embodiment of a clamp fixture assembly in accordance with an embodiment of the present disclosure.

FIG. 7 illustrates an exemplary clamp fixture 302 with a lower clamp 502, a middle clamp 602, and an upper clamp 402. As also illustrated in FIG. 7, and discussed at length herein, a coarse length adjustment of the clamp fixture 302 is held by a pin 702, while an adjustment bolt 504 provides a fine length adjustment of the clamp fixture 302. The clamp fixture 302 illustrated in FIG. 7 is orientated such that the workbench 104 would be attached on the left side (or top side) of the clamp fixture 302. This is reversed from the orientations illustrated in FIGS. 5 and 6.

As also illustrated in FIG. 7, the clamp fixture 302 is held to the workbench 104 between the lower clamp 502 and the middle clamp 602, with a top edge of the workbench 104 in contact with a bottom-side arm 602a of the middle clamp 602 and a bottom edge of the workbench 104 in contact with an inner arm 502a of the lower clamp 502. As also illustrated in FIG. 7, the front pegboard 102 is held between the middle clamp 602 and the upper clamp 402, with a bottom edge of the front pegboard 102 resting on a top-side arm 602b of the middle clamp 602 and a top edge of the front pegboard 102 held by the upper clamp 402. Note that the clamp fixture 302, illustrated in FIG. 7, is not drawn to scale, with a distance between the lower clamp 502 and the middle clamp 602 sufficient to clamp around a workbench 104, while the distance between the middle clamp 602 and the upper clamp 402 of the clamp fixture 302 is sufficient to clamp onto the front pegboard 102.

As discussed herein, a biasing member in each of the clamp fixtures 302 allows the middle clamp 602 and the upper clamp 402 to be adjusted for a variety of front pegboard 102 sizes yet retain sufficient tension on the front pegboard 102 to retain the front pegboard 102 in vertical position.

Figure 8:
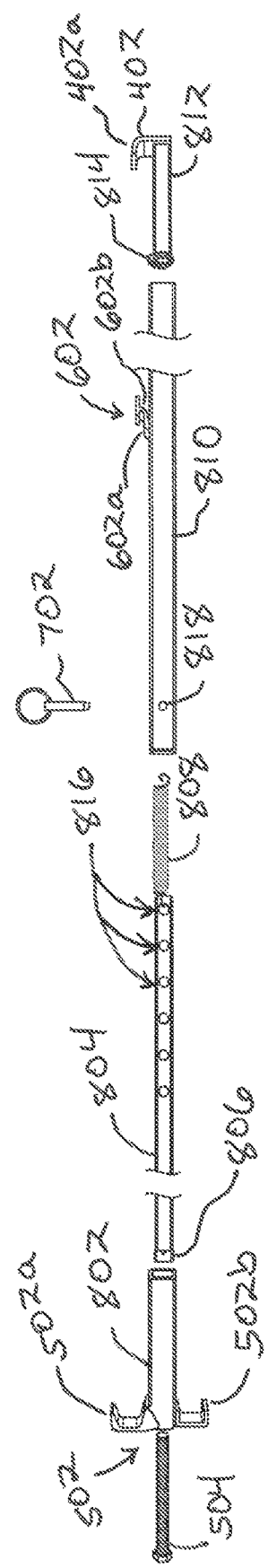
FIG. 8 is a top down, exploded, plane view of an embodiment of a clamp fixture assembly in accordance with an embodiment of the present disclosure.
Figure 9:
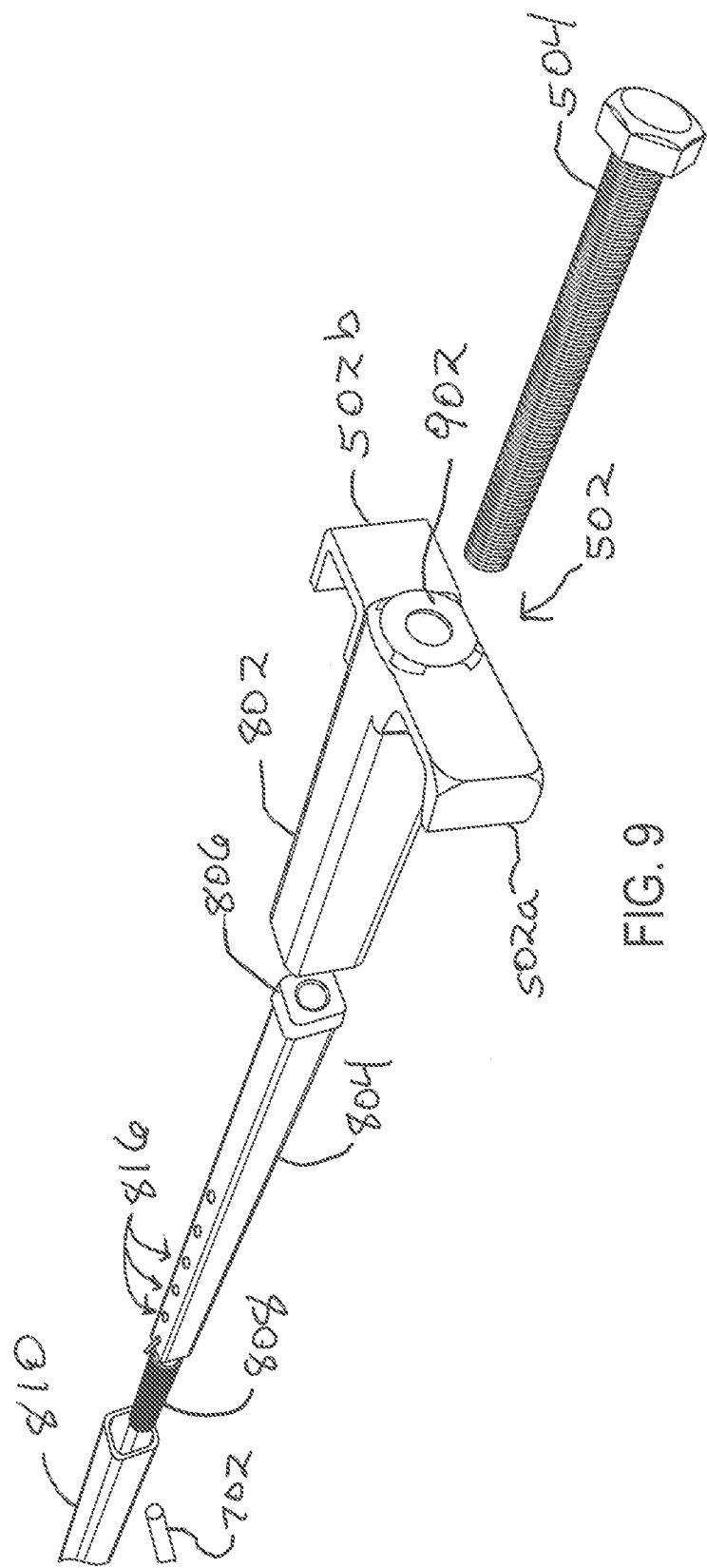
FIG. 9 is an exemplary three-dimensional perspective, exploded view of a bottom portion of a clamp fixture assembly in accordance with an embodiment of the present disclosure.
Figure 10:
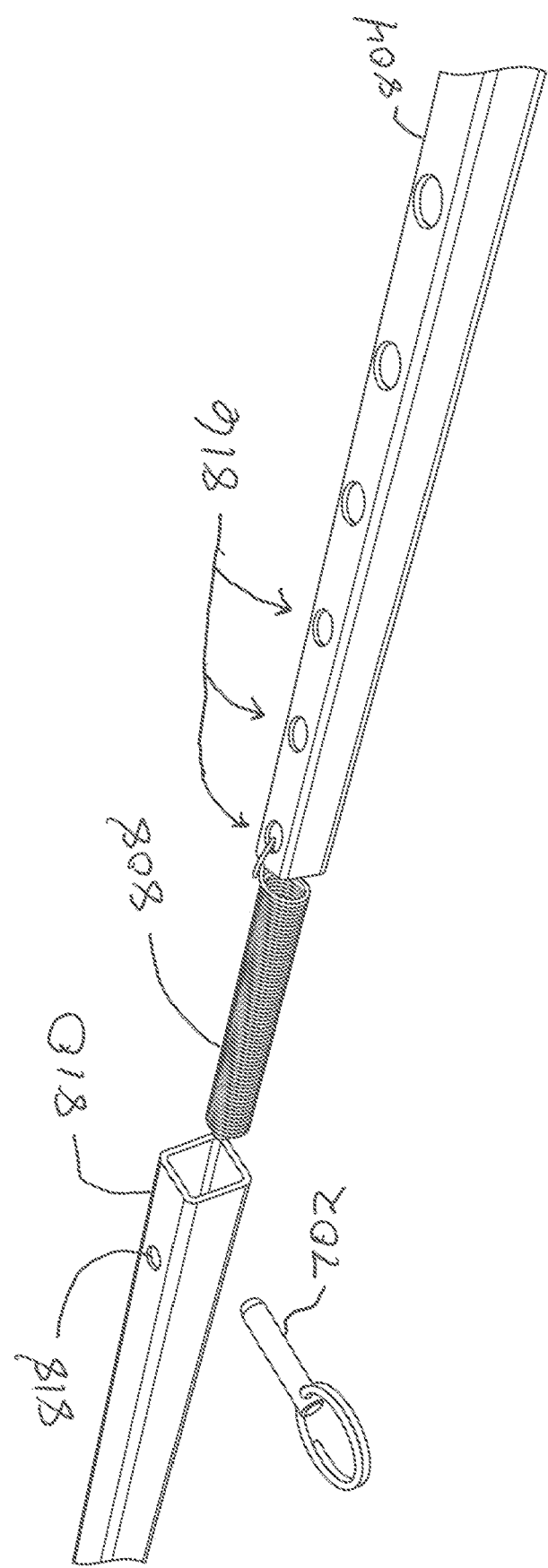
FIG. 10 is an exemplary three-dimensional perspective, exploded view of a middle portion of a clamp fixture assembly in accordance with an embodiment of the present disclosure.

FIGS. 8-10 illustrate an exploded view of the clamp fixture 302 illustrated in FIG. 7. As illustrated in FIG. 8, the adjustment bolt 504 extends through a hollow portion of a lower end portion 802 to enter a captured nut 806 on the bottom of a lower fixture portion 804. As illustrated in FIG. 8, adjusting the adjustment bolt 504 moves the bottom edge of the lower end portion 802 closer to the captured nut 806 on the bottom of the lower fixture portion 804. As also illustrated in FIG. 8, the lower end portion 802 includes the lower clamp 502.

FIG. 8 illustrates a first biasing member 808 that is attached to a top portion of the lower fixture portion 804 and extends through a hollow upper fixture portion 810 to attach to a lower portion 814 of an upper end portion 812 of the clamp fixture 302. As illustrated in FIG. 8, the first biasing member 808 may be a spring, which may be referred to as a first biasing spring member 808 or a first biasing member 808. As illustrated in FIG. 8, the retaining pin 702 extends into and through the upper fixture portion 810 through a pair of holes 818 and through a selected pair of holes of a plurality of hole pairs 816 in the lower fixture portion 804. As illustrated in FIGS. 7 and 8, the retaining pin 702 affixes the lower fixture portion 804 inside the upper fixture portion 810. As also illustrated in FIGS. 7 and 8, the upper end portion 812 extends down into the upper portion of the hollow upper fixture portion 810. As also illustrated in FIG. 8, the upper fixture portion 810 includes the middle clamp 602, while the upper end portion 812 includes the upper clamp 402. Alternative biasing members may be employed, and/or different springs. In further embodiments, the retaining pin 702 may be replaced with a bolt and captured nut, or a threaded bolt to retain the upper fixture portion 810 and the lower fixture portion 804.

In one exemplary embodiment, rather than using a spring for the first biasing member 808, the first biasing member 808 may be removed altogether and a weight added to the lower portion 814 of the upper end portion 812, which may then be referred to as a biasing weight member 814 or a second biasing member 814. Therefore, in one embodiment the biasing weight member 814 is affixed to the bottom of the upper end portion 812. In another embodiment the biasing weight member 814 is integral to the upper end portion 812. In other words, the weight of the upper end portion 812 (with biasing weight member 814) will be sufficient to apply the required bias/tension to retain the pegboard 102.

FIG. 9 provides another view of the lower end portion 802, with an opening 902 in the bottom of the lower end portion 802 sufficient to allow the adjustment bolt 504 to enter the lower end portion 802, pass through the lower end portion 802, and enter the captured nut 806 on the bottom of the lower fixture portion 804. In other words, the lower end portion 802 with its lower clamp 502 is retained by the adjustment bolt 504 when the adjustment bolt 504 is screwed into the retaining nut 806 on the bottom of the lower fixture portion 804.

FIG. 10 provides another view of the lower fixture portion 804 and the upper fixture portion 810. As illustrated in FIG. 10, the retaining pin 702 extends through a pair of holes 818 near the bottom of the upper fixture portion 810 and enters a pair of holes 816 in the lower fixture portion 804, such that the pin 702 extends through a hole 818 of the upper fixture portion 810, extends through the lower fixture portion 804 by passing through the selected pair of holes 816 in the lower fixture portion 804, to extend through an opposite hole 818 in the upper fixture portion 810. In other words, each of the holes illustrated in FIGS. 8-10 has a corresponding hole (816, 818) on the opposite side of the lower fixture portion 804 or upper fixture portion 810, respectively. As also illustrated in FIG. 10, the upper fixture portion 810 is hollow, allowing the first bias member 808 to be inserted into the upper fixture portion 810 and connect to the bottom portion 814 of the upper end portion 812. As discussed herein, the upper end portion 812 is inserted into the top of the upper fixture portion 810.

Figure 11:
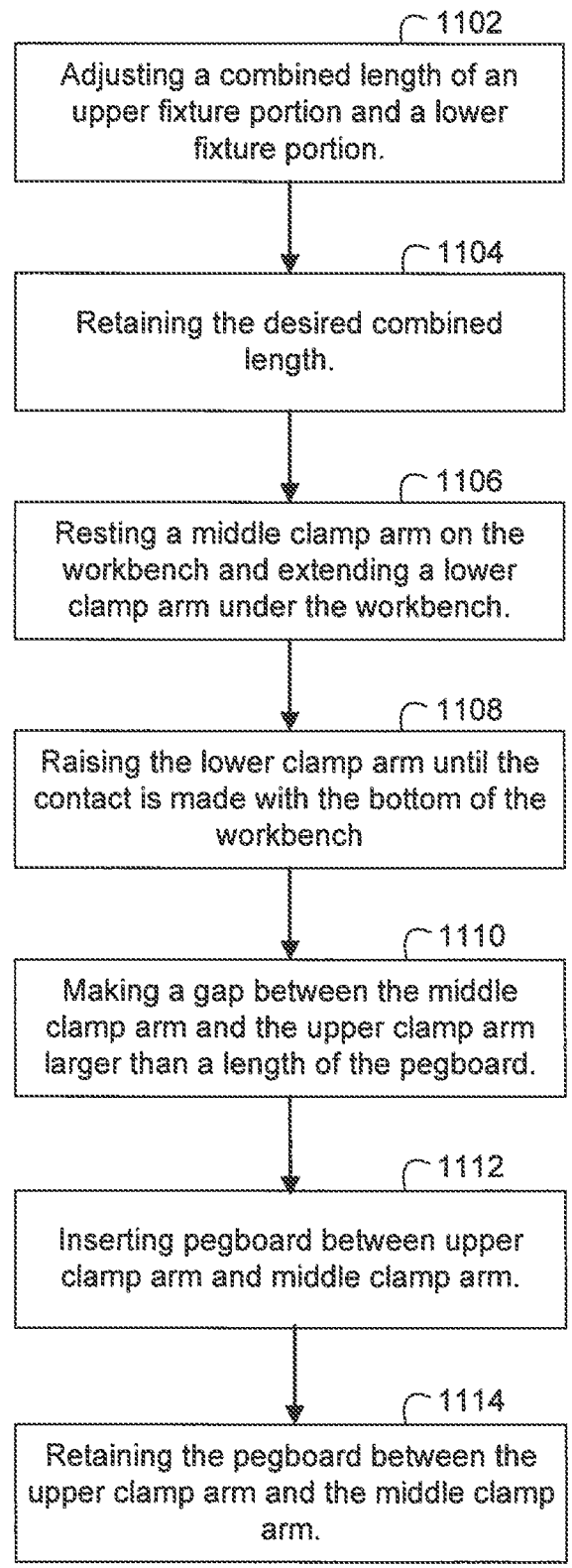
FIG. 11 is an exemplary flow diagram of steps to a method for affixing a pegboard to a workbench.

FIG. 11 illustrates the steps to a method for affixing a pegboard to a workbench. In step 1102 of FIG. 11, a combined length of an upper fixture portion and a lower fixture portion is adjusted. As discussed herein, the upper fixture portion 810 is slid into the lower fixture portion 804 until a desired combined length is reached. In step 1104 of FIG. 11, the desired combined length (of the upper fixture portion 810 and the lower fixture portion 804) is retained. As discussed herein, a retaining pin 702 is slide into a first hole 818 of the upper fixture portion 810 and through a pair of matching holes 816 of the lower fixture portion 804 to extend out through a second, opposite hole 818 of the upper fixture portion 810.

In step 1106 of FIG. 11, a middle clamp 602 of the upper fixture portion 810 is rested on the workbench 104 and a lower end portion 802 of the lower fixture portion 804 is extended under the workbench 104. As discussed herein, the pinned upper fixture portion 810 and lower fixture portion 804 are arranged such that a bottom-side arm 602a of the middle clamp 602 rests on a top surface of the workbench 104 and an inner arm 502a of a lower clamp 502 of the lower end portion 802 extends underneath a bottom surface of the workbench 104. In step 1108 of FIG. 11, the lower clamp 502 is raised until contact is made with the bottom of the workbench 104. As discussed herein, by rotating an adjustment bolt 504 on the bottom of the lower clamp 502, the lower end portion 802 raises up and further over the end of the lower fixture portion 804 until the inner arm 502a of the lower clamp 502 contacts the bottom surface of the workbench 104.

In step 1110 of FIG. 11, a gap between the middle clamp 602 and the upper clamp 402 is made larger than a length of the pegboard 102. As discussed herein, by pulling out a biased upper end portion 812 out of the top of the upper fixture portion 810, a gap between the upper clamp 402 and the middle clamp 602 grows. In step 1112 of FIG. 11, a pegboard 102 is inserted lengthwise between the upper clamp 402 and a top-side arm 602b of the middle clamp 602. In step 1114 of FIG. 11, the biased upper end portion 812 is released to retain the pegboard 102 between the upper clamp 402 and the top-side arm 602b of the middle clamp 602. As discussed herein, releasing the biased upper end portion 812 allows the biased upper end portion 812 to slide back down into the top of the upper fixture portion 810.

Figure 12:
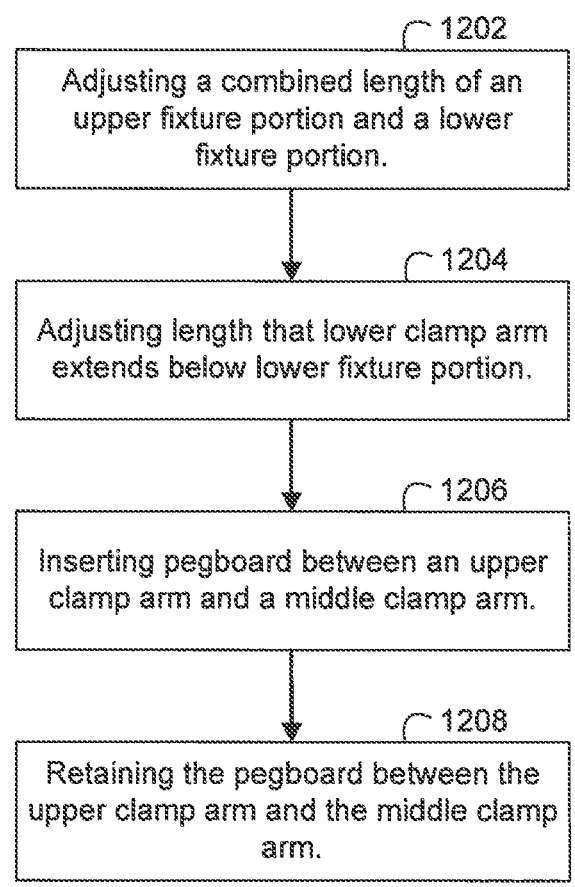
FIG. 12 is an exemplary flow diagram of steps to a method for affixing a pegboard to a workbench.

FIG. 12 illustrates the steps to a method for affixing a pegboard to a workbench. In step 1202 of FIG. 12, a combined length of an upper fixture portion 810 and a lower fixture portion 804 is adjusted to arrange a length of an adjustable length fixture. As discussed herein, the upper fixture portion 810 is slid into the lower fixture portion 804 until a desired combined length is reached.

In step 1204 of FIG. 12, a length is adjusted by lowering a lower end portion 802 that extends below the lower fixture portion 804. As discussed herein, adjusting a length of an adjustment bolt 504 that extends into the lower fixture portion 804, adjusts a length that the lower end portion 802 extends below the lower fixture portion 804, such that a bottom side arm 602a of a middle clamp 602 of the upper fixture portion 810 contacts a top surface of the workbench 104 and an inner arm 502a of a bottom clamp 502 of the lower end portion 802 contacts a bottom surface of the workbench 104.

In step 1206 of FIG. 12, a pegboard is inserted between an upper clamp 402 of an upper end portion 812 and a top-side arm 602b of the middle clamp 602. As discussed herein, by extending a biased upper end portion 812 out of the top of the upper fixture portion 810, a gap between the upper clamp 402 and the middle clamp 602 is enlarged enough to allow the pegboard to be inserted between the upper clamp 402 and the top-side arm 602b of the middle clamp 602. In step 1208 of FIG. 12, the pegboard 102 is retained between the upper clamp 402 and the middle clamp 602. As discussed herein, by releasing the biased upper end portion 812, the biased upper end portion 812 is allowed to slide back down into the top of the upper fixture portion 810 to retain the pegboard 102 between the upper clamp 402 and the middle clamp 602.

The above described components of the clamp fixtures 302 that make up a clamp assembly 300 may be manufactured from a variety of different materials. In the illustrated embodiment, the upper end portion 812, upper fixture portion 810, lower fixture portion 804, and lower end portion 802 are formed from elongate steel square tube. Without implying any limitations, example materials include metals such as steel and aluminum, and plastics. Such materials may also be used in combinations (a clamp fixture 302 comprising a variety of materials). It is also understood that while a square cross-section tubular members for the clamp fixtures 302 is illustrated, other shapes are also possible, such as round or rectangular. Still further, although illustrated in connection with a pegboard 102, it should be further appreciated that alternative panels may be mounted with the clamp fixtures of the present invention, including plywood or other forms of panels.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A clamp fixture for affixing panels to a workbench, said clamp fixture comprising:
    a lower fixture portion that adjustably mates with an upper fixture portion and a lower end portion, wherein said upper fixture portion further comprises an upper end portion;
    a biasing member connecting said upper end portion with said lower fixture portion, wherein said biasing member comprises a spring;
    a lower clamp disposed on said lower end portion, wherein said lower clamp is operable to engage a bottom area of a workbench;
    a first middle clamp and a second middle clamp disposed on said upper fixture portion, wherein said first middle clamp is operable to engage a top area of a workbench; and
    an upper clamp disposed on said upper end portion;
    wherein said lower clamp and said first middle clamp are adjustably separable relative to each other via said lower fixture portion to affix said clamp fixture to a workbench, and wherein said second middle clamp and said upper clamp are configured to hold a panel there between, wherein said upper end portion is separate from said upper fixture portion whereby said upper clamp and said second middle clamp are adjustably separable relative to each other.

2. The clamp fixture of claim 1, further including an adjustment fastener connecting said lower end portion with said lower fixture portion, said adjustment fastener extending through a lower end of said lower end portion to engage with said lower fixture portion, and wherein said adjustment fastener is configured to adjustably tighten engagement of said lower clamp and said first middle clamp with a workbench.

3. The clamp fixture of claim 2, wherein said lower fixture portion includes a hole and wherein said upper fixture portion includes a hole, and wherein said clamp fixture further includes a pin with said hole of said upper fixture portion being alignable with said hole of said lower fixture portion and said pin being insertable through the aligned said holes to engage said upper fixture portion with said lower fixture portion.

4. The clamp fixture of claim 3, wherein said hole of said lower fixture portion comprises a plurality of holes extending along an elongate length of said lower fixture portion, with said holes of said lower fixture portion being selectively alignable with said hole of said upper fixture portion.

5. The clamp fixture of claim 1, wherein said first middle clamp and said second middle clamp are unitarily formed.

6. The clamp fixture of claim 1, wherein said lower clamp comprises an inner clamp arm extending from said lower end portion, with said inner clamp arm configured to engage a lower edge of a workbench, and wherein said first middle clamp comprises a downwardly oriented clamp arm extending from said upper fixture portion and is configured to engage an upper edge of a workbench.

7. The clamp fixture of claim 6, wherein said lower clamp further comprises an outer clamp arm configured to support a panel at a rear of a workbench.

8. The clamp fixture of claim 1, wherein said upper clamp comprises an upper clamp arm extending from said upper end portion, and wherein said second middle clamp arm comprises an upwardly oriented clamp arm extending from said upper fixture portion.

9. The clamp fixture of claim 1, wherein said upper end portion, said upper fixture portion, said lower fixture portion, and said lower end portion comprise elongate tubular members.

10. A clamp fixture assembly for affixing panels to a workbench, said clamp fixture assembly comprising a plurality of clamp fixtures with said clamp fixtures comprising:
    a lower fixture portion that adjustably mates with an upper fixture portion and a lower end portion, wherein said upper fixture portion further comprises an upper end portion;

a lower clamp disposed on said lower end portion, wherein said lower clamp is operable to engage a bottom area of a workbench;

a first middle clamp and a second middle clamp disposed on said upper fixture portion, wherein said first middle clamp is operable to engage a top area of a workbench; and an upper clamp disposed on said upper end portion;

wherein said lower clamp and said first middle clamp are adjustably separable relative to each other via said lower fixture portion to affix said clamp fixture to a workbench, and wherein said second middle clamp and said upper clamp are configured to hold a panel there between;

wherein said upper end portion is separate from said upper fixture portion whereby said upper clamp and said second middle clamp are adjustably separable relative to each other with a biasing member connecting said upper end portion with said lower fixture portion, and further including an adjustment fastener connecting said lower end portion with said lower fixture portion, said adjustment fastener extending through a lower end of said lower end portion to engage with said lower fixture portion, and wherein said adjustment fastener is configured to adjustably tighten engagement of said lower clamp and said first middle clamp with a workbench, wherein said biasing member of said clamp fixtures comprises a spring.

11. The clamp fixture assembly of claim 10, wherein said upper end portion, said upper fixture portion, said lower fixture portion, and said lower end portion of said clamp fixtures comprise elongate tubular members.

12. The clamp fixture assembly of claim 11, wherein said lower fixture portions include a hole and wherein said upper fixture portions include a hole, and wherein said clamp fixtures further includes a pin with said holes of said upper fixture portions being alignable with said holes of said lower fixture portions and said pins being insertable through the aligned said holes to engage said upper fixture portions with said lower fixture portions.

13. The clamp fixture assembly of claim 10, wherein said first middle clamp of each said upper fixture portion is unitarily formed with the respective said second middle clamp on said upper fixture portion.

14. The clamp fixture assembly of claim 1, wherein said lower clamps comprise an inner clamp arm extending from said lower end portions, with said inner clamp arms are configured to engage a lower edge of a workbench, and wherein said first middle clamps comprises downwardly oriented clamp arms extending from said upper fixture portions with said clamp arms of said first middle clamps configured to engage an upper edge of a workbench.

* * * * *